United States Patent [19]
Rourke et al.

[11] Patent Number: 4,765,909
[45] Date of Patent: Aug. 23, 1988

[54] ION EXCHANGE METHOD FOR SEPARATION OF SCANDIUM AND THORIUM

[75] Inventors: William J. Rourke, Worcester; Wen-Chao Lai, Westboro; Samuel Natansohn, Sharon, all of Mass.

[73] Assignee: GTE Laboratories Incorporated, Waltham, Mass.

[21] Appl. No.: 42,150

[22] Filed: Apr. 23, 1987

[51] Int. Cl.$^4$ .............................................. B01D 15/04
[52] U.S. Cl. .................................... 210/672; 210/682; 210/688; 423/7; 423/21.5; 423/DIG. 14; 75/101 BE; 75/121
[58] Field of Search ............... 423/21.5, 6, 7, DIG. 14; 75/101 BE, 121; 210/660, 681, 682, 688, 672

[56] References Cited

U.S. PATENT DOCUMENTS

| | | | |
|---|---|---|---|
| 2,874,039 | 2/1959 | Pruvot et al. | 75/84.5 |
| 2,925,431 | 2/1960 | Choppin et al. | 423/7 |
| 3,013,859 | 12/1961 | Kuhlman, Jr. et al. | 23/22 |
| 3,146,063 | 8/1964 | Moore et al. | 423/21.5 |
| 3,575,687 | 4/1971 | Drobnick | 423/21.5 |
| 4,459,268 | 7/1984 | Clifton et al. | 423/7 |
| 4,624,703 | 11/1986 | Vanderpoll et al. | 75/101 |
| 4,626,280 | 12/1986 | Vanderpoll et al. | 75/101 |

*Primary Examiner*—Robert L. Stoll
*Attorney, Agent, or Firm*—Ivan L. Ericson

[57] ABSTRACT

A method for a quantitative separation of scandium from thorium comprises adsorption of both metals on a cation exchange resin followed by selective elution of scandium with an acidic solution of a chelating agent followed by the elution of thorium by a six normal hydrochloric acid solution.

2 Claims, 1 Drawing Sheet

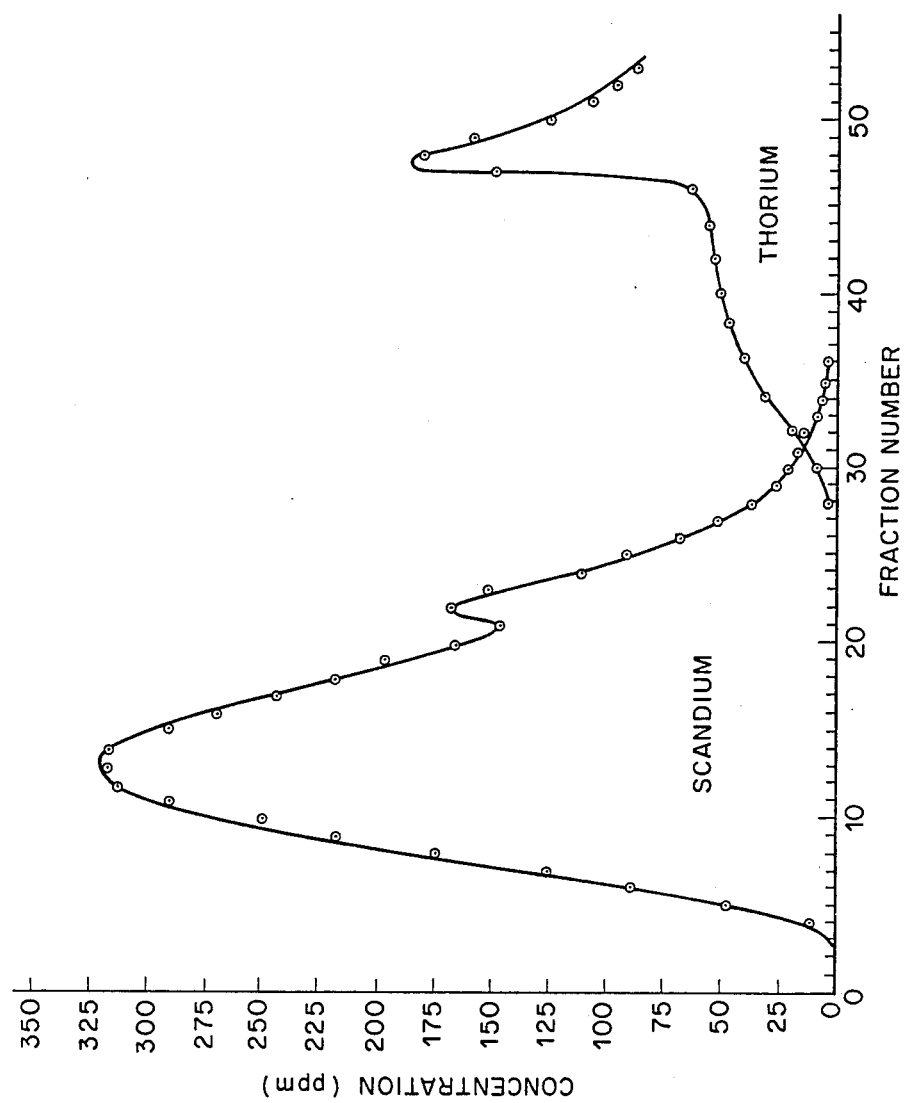

ION EXCHANGE METHOD FOR SEPARATION OF SCANDIUM AND THORIUM

FIELD OF INVENTION

This invention relates to a method for the separation of scandium and thorium. More particularly, this invention relates to an ion exchange method for separation of scandium and thorium.

BACKGROUND OF THE INVENTION

Scandium and thorium are two metals characterized by a high charge to radius ratio. Consequently, they tend to behave similarly in the complexation reactions which are the basis of hydrometallurgical separations. For instance, when scandium is extracted from the solution of tungsten digestion sludge with thenoyltrifluoroacetone (TTA) the only element coextracted in significant amounts is thorium, although more than a dozen other elements are present in the solution. Furthermore, the quantitative separation of scandium from thorium by a simple precipitation or extraction is extremely difficult because of this similarity in the chemical properties of the ions in solution which causes co-extraction. This problem can be dealt with in a satisfactory fashion by the process disclosed here.

SUMMARY OF THE INVENTION

In accordance with one aspect of the present invention, a new and improved method for the separation of scandium and thorium comprises the following steps:

Step 1—A solution comprising scandium and thorium is adjusted to an acidic pH to form an acid solution.

Step 2—The acid solution from step 1 is contacted with a cation exchange resin.

Step 3—The scandium and thorium are retained on the cation exchange resin.

Step 4—The scandium from the cation exchange resin is eluted with a first elution solution.

Step 5—The thorium from the cation exchange resin is eluted with a second elution solution.

BRIEF DESCRIPTION OF THE DRAWING

In the drawing:

The single figure is a curve of the concentration of scandium and thorium as a function of the fraction number of the effluent in accordance with the present invention.

For a better understanding of the present invention, together with other and further objects, advantages and capabilities thereof, reference is made to the following disclosure and appended claims in connection with the above-described drawing.

DETAILED DESCRIPTION OF THE INVENTION

In the process of the present invention, the metals scandium and thorium present in even very dilute solutions have been completely adsorbed by a strong cation exchange resin in the hydrogen form. After the resin has been loaded with the metals, scandium was eluted selectively leaving the thorium on the resin. The thorium was subsequently eluted under different conditions. In this way the metals were both concentrated, in the adsorption step, and completely separated from one another in the elution step(s).

EXAMPLE

One liter of a solution containing 25 ppm scandium and 25 ppm thorium was adjusted to a pH of 1.95. An ion exchange column consisting of 10 g of a cation exchange resin having a sulfonic acid functionality such as Amberlite 1R-118(+)(Rohm and Haas ion exchange resin was prepared and converted to the hydrogen ion form by passing 1N hydrochloric acid through the column until the effluent was acidic. Deionized water was then pressed through the column until the effluent was neutral. The resin bed obtained was about 1 $cm^2$ in cross-sectional area and 10 cm in length. The solution of scandium and thorium was then passed through this column at a flow rate of 4 ml per minute. The effluent was collected as a single 1 liter fraction, and the scandium and thorium concentrations in this effluent were found to be much less than 0.05 ppm. Since the concentrations in the feed solution were 25 ppm, adsorption of both metals on the resin was equal to or greater than 99.8%.

Elution of scandium from the resin was accomplished with an eluant consisting of a solution of diglycolic acid in hydrochloric acid. The concentration of diglycolic acid was 0.1M and the concentration of hydrochloric acid was 1.2M. When elution of scandium was nearly complete the eluant was changed to pure 6N hydrochloric acid to displace thorium from the resin. The effluent was collected in equal volume fractions of 5 milliliters for analytical purposes. Scandium and thorium concentrations in these fractions were determined by Direct Current Plasma Atomic Emission Spectroscopy (DCP). The results are given in Table 1 and depicted in the single figure. It is obvious from the results that essentially a complete separation of scandium and thorium has been achieved.

TABLE 1

| Fraction | Scandium | Thorium |
| --- | --- | --- |
| 1 | 0 | |
| 2 | 0 | |
| 3 | 0 | |
| 4 | 1.17 ppm | |
| 5 | 4.81 | |
| 6 | 8.93 | |
| 7 | 12.5 | |
| 8 | 17.3 | |
| 9 | 21.8 | |
| 10 | 25.0 | |
| 11 | 29.0 | |
| 12 | 31.2 | |
| 13 | 31.7 | |
| 14 | 31.7 | |
| 15 | 29.0 | |
| 16 | 26.9 | |
| 17 | 24.4 | |
| 18 | 21.7 | |
| 19 | 19.0 | |
| 20 | 16.5 | |
| 21 | 14.7 | |
| 22 | 16.7 | |
| 23 | 15.1 | |
| 24 | 11.6 | .094 ppm |
| 25 | 9.03 | |
| 26 | 6.74 | .094 ppm |
| 27 | 5.17 | |
| 28 | 3.77 | .194 |
| 29 | 2.60 | |
| 30 | 2.21 | .949 |
| 31 | 1.71 | |
| 32 | 1.56 | 1.65 |
| 33 | 0.98 | |
| 34 | 0.68 | 3.07 |
| 35 | 0.50 | |
| 36 | 0.36 | 4.05 |

TABLE 1-continued

| Fraction | Scandium | Thorium |
|---|---|---|
| 37 | 0.29 | |
| 38 | 0.22 | 4.88 |
| 39 | 0.18 | |
| 40 | 0.15 | 5.18 |
| 41 | | |
| 42 | 0.06 | 5.32 |
| 43 | | |
| 44 | 0.12 | 5.66 |
| 45 | | |
| 46 | | 6.30 |
| 47 | | 15.0 |
| 48 | | 18.2 |
| 49 | | 15.9 |
| 50 | | 12.6 |
| 51 | | 10.7 |
| 52 | | 9.6 |

Because of the slight overlap of the scandium and thorium peaks the percent scandium recovered and the purity will be interrelated. That is, opting for 100% scandium recovery will result in some degree of contamination with thorium. The extent of contamination as a function of recovery can be calculated by integrating the elution curves. These calculations have been performed for the fractions in the region of overlap. The results are shown in Table 2.

TABLE 2

| Fraction | % Sc Eluted | Sc/(Sc + Th) |
|---|---|---|
| 26 | 95.6% | .999 |
| 28 | 97.6% | .998 |
| 30 | 98.7% | .995 |
| 32 | 99.5% | .989 |

These results indicate that if fraction 28 were taken as a cut off, 95–96% of the scandium would have been eluted contaminated by only about 0.1% thorium. On the other hand, taking fraction 32 as a cut off to increase scandium recovery to 99.5%, would result in a product contaminated by 1.1% thorium.

The advantage of the present process over prior techniques is the ability to operate at ambient temperature precluding more expensive processing.

While there have been described what are at present considered the preferred embodiments of the invention it will be obvious to those skilled in the art that various changes may be made therein without departing from the scope of the invention as defined by the appendix claims.

What is claimed is:

1. A method for separating scandium and thorium comprising the following steps:
Step 1—adjusting a solution comprising scandium and thorium to an acidic pH to form an acid solution having a pH of about 1.95;
Step 2—contacting the acid solution from step 1 with a cation exchange resin, said cation exchange resin having a sulfonic acid functionality;
Step 3—retaining said scandium and thorium on said cation exchange resin;
Step 4—eluting said scandium from said cation exchange resin with a first elution solution comprising about 0.1M diglycolic acid and 1.2M hydrochloric acid; and
Step 5—eluting said thorium from said cation exchange resin with a second elution solution comprising about 6N hydrochloric acid.

2. A method for separating scandium and thorium in accordance with claim 1 wherein step 1 through step 5 is carried out at ambient temperatures.

* * * * *

UNITED STATES PATENT OFFICE
CERTIFICATE OF CORRECTION

Patent No. 4,765,909          Dated August 23, 1988

Inventor(s) William J. Rourke, Wen-Chao Lai, Samuel Natansohn

It is certified that error appears in the above-identified patent and that said Letters Patent is hereby corrected as shown below:

Column 2, line 30, after "...analytical purposes.", please insert --The equal volume fractions were diluted by a factor of 10.--

Column 2, line 34 after "...single figure.", please insert --The figure has been adjusted to remove the effect of the dilution of the equal volume fractions.--

Signed and Sealed this

Fourteenth Day of January, 1992

Attest:

HARRY F. MANBECK, JR.

*Attesting Officer*          *Commissioner of Patents and Trademarks*